April 4, 1944. G. R. ERICSON ET AL 2,346,016
CARBURETOR
Filed May 7, 1932 5 Sheets-Sheet 1

GEORGE R. ERICSON
CHARLES E. MARKHAM
INVENTOR

BY F. H. Gibbs
ATTORNEY

Patented Apr. 4, 1944

2,346,016

UNITED STATES PATENT OFFICE 2,346,016

CARBURETOR

George R. Ericson, Maplewood, Mo., and Charles E. Markham, East St. Louis, Ill., assignors to Carter Carburetor Corporation, St. Louis, Mo., a corporation of Delaware Application May 7, 1932, Serial No. 609,820

27 Claims. (Cl. 261—39)

This invention relates to carburetors, and particularly to devices controlled by heat and suction for varying the fuel mixture ratio in accordance with the operating temperature of the engine. Various devices of this general character have been provided, but they have not been entirely satisfactory, because of the difficulty in obtaining a prompt response of the mixture controlling devices when the engine begins to run under its own power, particularly under cold weather conditions.

It is an object of this invention to provide a generally new and improved carburetor having devices for automatically controlling the mixture ratio with respect to the various operating conditions of the engine as to give the desired fuel mixture without any special attention on the part of the operator.

Other objects will appear from the following description and accompanying drawings, referring to which:

Figure 1:
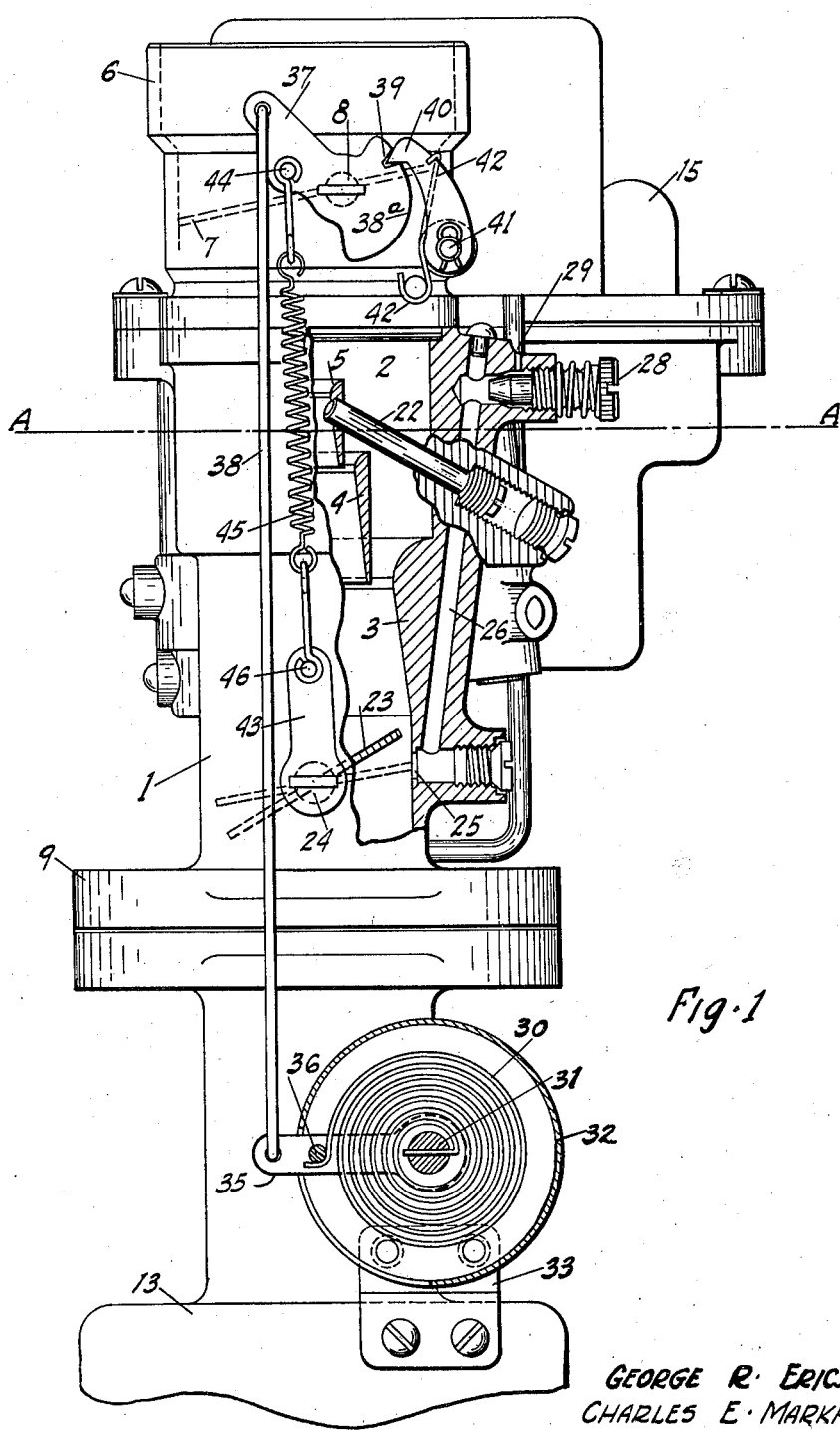
Figure 1 is a side elevation of a carburetor constructed according to our invention, with parts broken away and others shown in section.

The reference numeral 1 indicates the body member of a carburetor which, in this particular embodiment, is of the downdraft type. The body member 1 is provided with a downwardly extending mixing conduit therein generally indicated by the reference numeral 2. This mixing conduit is restricted by means of the main venturi 3, secondary venturi 4, and primary venturi 5 at the upper end of the main body member. An air inlet member or air horn 6 is provided, and the admission of air to the mixing conduit through the air horn is controlled by a valve 7 which is eccentrically mounted on the transverse shaft 8, the amount of eccentricity of the valve 7 may vary with different installations.

The lower end of the main body member is provided with a flange 9 which is attached by any suitable means (not shown) to the intake manifold 11 of an internal combustion engine. The exhaust manifold of the engine is indicated at 12, and it will be understood that a portion of the exhaust surrounds or otherwise comes in contact with the intake manifold and forms a hot spot 13. These elements are of conventional construction and need not be further described.

The carburetor is provided with a fuel bowl 14 to which fuel may be supplied in any suitable manner, as for instance, by the conduit 15. Fuel is preferably maintained in the bowl at a constant level A—A by the float 16 and float valve 17. A suitable vent 18 for admitting air to the bowl at a point above the fuel level is provided.

The fuel is supplied from the bowl to the primary venturi by means of the main jet 19 which delivers fuel through cross passage 20 and chamber 21 to the fuel nozzle 22. This nozzle discharges at the most restricted point in the smallest venturi, as indicated in Figure 1, but it should be understood that the invention is capable of use with a single venturi or even with a mere passageway, if desired.

The discharge of fuel mixture from the carburetor is controlled by throttle valve 23 mounted on shaft 24 in the lower part of the main body member, and the fuel for low speed operation is supplied through a port or ports 25 having openings both above and below the edge of the throttle valve when it is in closed position, as indicated in Figure 1. This port is supplied with fuel through conduit 26 which communicates with the upper part of the chamber 21 by means of restricted port 27. Means for admitting air in regulated quantities to the tube 26 is also provided in the form of a manually adjustable screw 28. This screw controls an air admission port 29 in a conventional manner. From the above description, it will be seen that the means for supplying fuel from the float chamber to the mixing conduit comprises a branched conduit having an inlet 19 and branches 22 and 26 connected by a calibrated restriction 27 for supplying fuel for high and low speed operation, respectively. For controlling the choke valve, the thermostat 30 of the usual bimetallic coil construction is mounted on a shaft 31 carried by a housing 32 which is mounted on exhaust manifold 12 by means of the bracket 33. The shaft 31 is frictionally held in position with respect to the housing 32 by means of any suitable spring device 34, so that it may be rotated slightly in a clockwise position with respect to Figure 1 for the purpose of enriching the mixture, or in an opposite direction for the purpose of leaning it out. It will be noted that the adjusting handle 34 is located behind the housing 32, so that it is not particularly noticeable and does not invite tampering by unskilled persons, and, at the same time, it can be conveniently reached by any one who has knowledge of its construction and operation.

A yoke 35 is mounted on the shaft 31 with substantial clearance to permit free rotation, and the yoke comprises a cross member 36 which is adapted to be engaged by the outer end of the thermostat. It may be noted at this point that the thermostat turns in an anti-clockwise direction or winds up when heat is applied, and vice versa. The choke valve 7 is provided with an operating arm 37 which may be connected to the shaft 7 either directly or by means of a spring, and a link 38 is provided for connecting the operating arm 37 with the yoke 35 on the thermostat.

The arm 37 is provided with a cam surface 38a which, in this instance, is in the form of an arc of a circle, and near one end of the cam surface a notch 39 is formed. The circular portion 38a of the cam is not necessarily concentric with the shaft 8 in the preferred construction. This circular portion has its center slightly below the center of the shaft 8, so that no resistance would be presented to the closing action of the choke valve under the influence of the thermostat. A latch member 40 mounted on pivot 41 and normally held in engagement with the cam surface 38 by a spring 42 is provided for controlling the opening movement of the valve 7 in conjunction with the thermostat.

Figure 2:
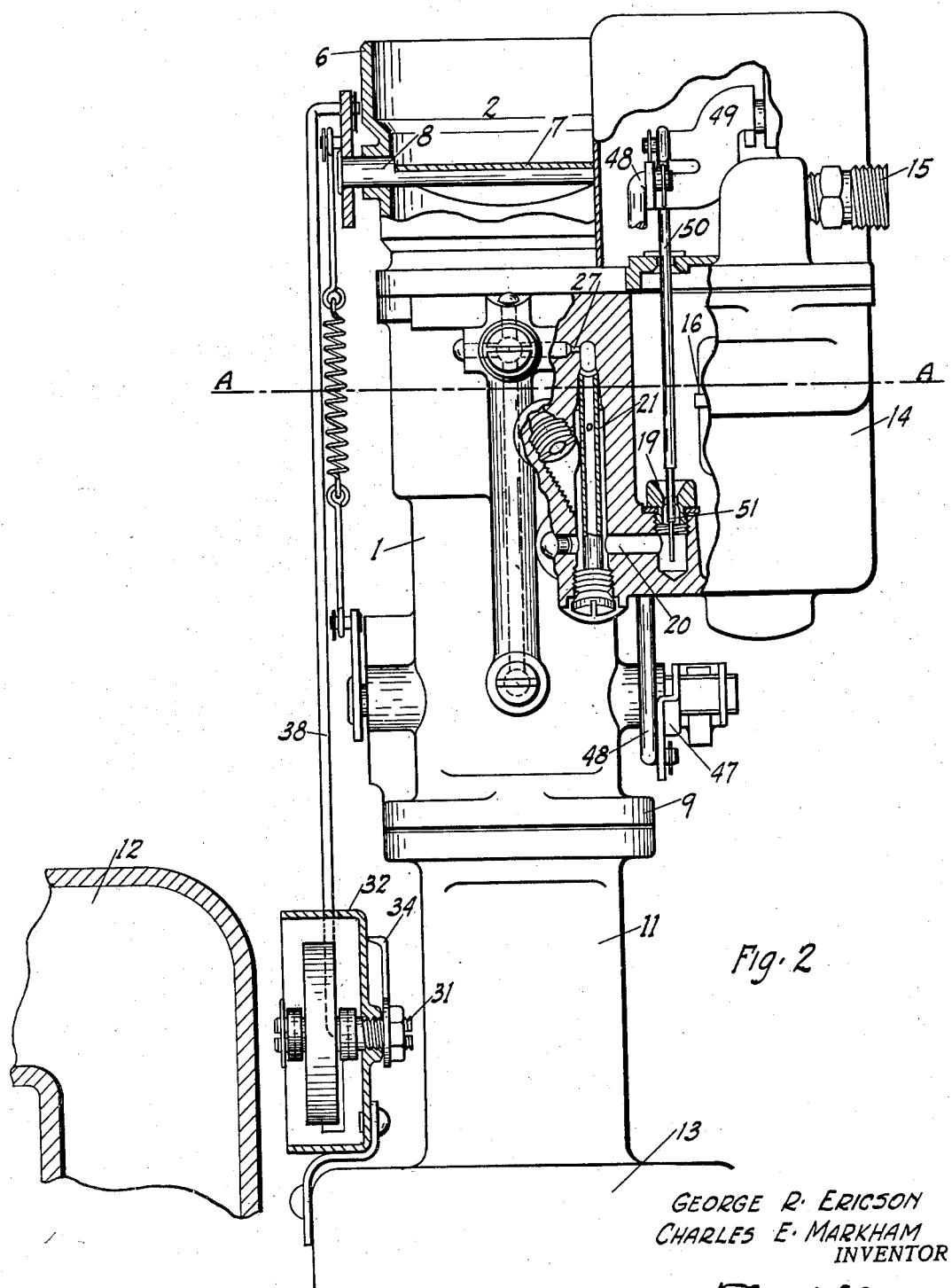
Figure 2 is an end elevation of the carburetor shown in Figure 1, with parts broken away and others shown in section.

The throttle 23 is provided with a lever 43 which is mounted on the throttle shaft in such a position that it crosses the center line between the shaft 24 and a pin 44 on the member 37 at a time when the throttle valve is about one-third of the way open. A spring connection 45 is provided to connect pin 44 and a pin 46 in the arm 43. The throttle is also connected by means of a crank 47, link 48, and rocker arm 49 to a metering rod 50. The metering rod is provided with one or more steps 51 of different sizes, so that the amount of fuel admitted to the inlet opening 19 will be controlled by the throttle position. The operation of the device shown in Figures 1 and 2 is as follows:

If the motor has not been running recently, the exhaust 12, hot spot 13, and thermostat 30 will be cold. The thermostat will assume the position shown in Figure 1, close the valve 7, and the latch 40 will drop into the notch 39. As the engine is being cranked, the valve 7 remains in substantially closed position, although a slight breathing action may be obtained, if desired, either by enlarging the notch 39 or inserting a spring between the lever 37 and the shaft 8 instead of mounting the lever rigidly on the shaft.

When the engine begins to fire and run under its own power, its speed will substantially increase. It will be understood that the valve 23 will be in a partly open position, as indicated in Figure 1, during the starting operation, having been opened either manually or otherwise, as desired, and the increased suction produced by the engine will be communicated to the valve 7. The increased suction applied in this manner will overcome the resistance of the latch 40 and the resistance of the thermostat so that the valve 7 may be opened to a substantial extent though not wide open.

After the starting operation, particularly if the throttle valve is interconnected with the starter, it may be dropped back to the idling position indicated by the dotted lines indicated in Figure 1. If this occurs, the suction on the valve 7 will be decreased and the valve would tend to close and permit the latch 40 to drop in the notch 39, and the engine would stall from having too rich a mixture. In order to prevent this, the connection 45 is provided. The closing of the throttle 23 pulls downwardly on the arm 37 by means of the spring 45. It will be understood that this downward pull is resisted by the thermostat in accordance with the temperature, so that when the throttle is moved to the idling position, the choke valve is automatically opened to a degree corresponding to the temperature conditions. It will be understood that the above applies only to low temperature conditions, and if the atmospheric temperature is at 60 degrees Fahrenheit or higher, the valve 7 would not be closed by the thermostat after starting, even if the spring connection 45 was omitted. However, under cold starting conditions, it takes an appreciable amount of time to warm up the thermostat 30, and the linkage 45 is important under these conditions.

When the throttle is moved to wide open immediately after starting, the resistance of the thermostat to the opening of the valve 7 is sufficient to cause an unduly rich mixture to be supplied, and the engine would load or roll. To prevent this, the arm 43 swings over in an anti-clockwise direction as the throttle is opened, and the spring 45 supplies a strong downward pull to open the valve 7. This is applied against the thermostat, and the opening movement will correspond to the temperature condition so that under extreme cold conditions, the choke valve 7 would not be opened so much by full opening of the throttle as it would under higher temperature conditions. Also, the choke may be opened during cranking when the latch is engaged by opening the throttle valve beyond the solid line position in Fig. 1, which forces the latch outwardly against spring 42.

It will be understood that the fuel in the float bowl is more or less open to atmospheric pressure by means of the vent 18 (see Figure 3), and the effect of the choke valve 7 is to control the amount of fuel delivered either to the nozzle 22 or port 25, or both, as the case may be.

When reference to the devices shown in Figures 3 to 10, the same general principles of construction and operation apply. The choke valve 70 is cut away, as indicated at 71, to permit the insertion of a spring controlled latch member 72. This latch member is pivoted at 73 and is yieldably prevented from turning on the pivot by a spring 74, which is attached at one end to the bracket 75 on the choke valve, and at the other end to the member 72. The choke valve is operated by the thermostat through an arm 76 which corresponds to the arm 37, except that the cam surfaces are omitted. The spring connection 45 is also used. A catch member 77 is pivoted at 78 to the air horn of the carburetor, and a weak spring 79 is provided to yieldably hold the member 77 in the position shown in Figures 6 and 7. It may be noted that the spring 74 is comparatively stronger than spring 79, so that there is a comparatively strong resistance to opening of the valve 70 by suction, but a comparatively weak resistance against closing of this valve by the thermostat.

Figure 4:
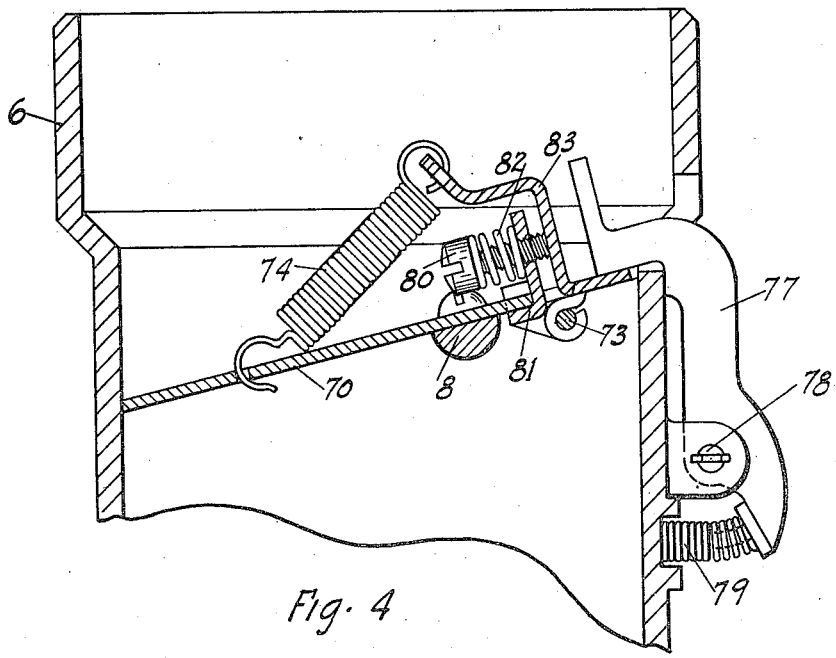
Figure 4 is a vertical sectional detail view showing a modified form of choke valve controlling device.
Figure 5:
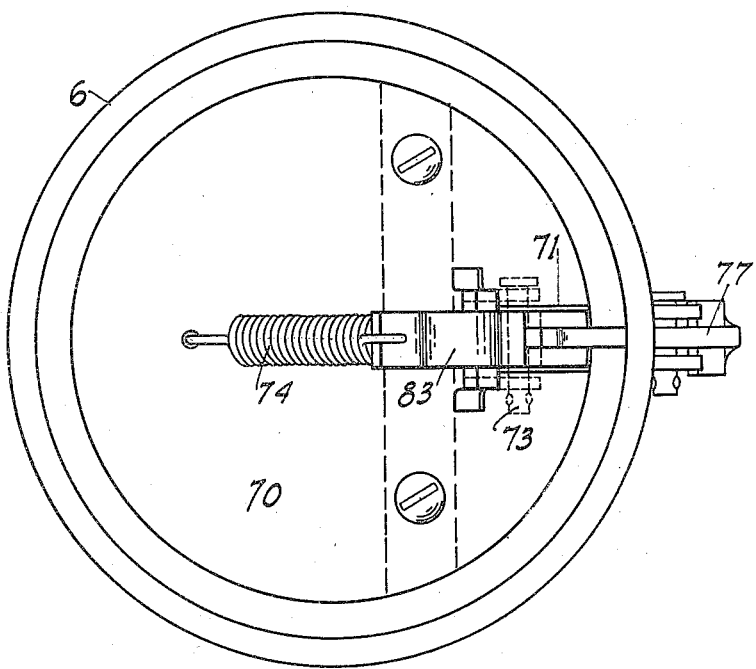
Figure 5 is a plan view of the parts shown in Figure 4.
Figure 6:
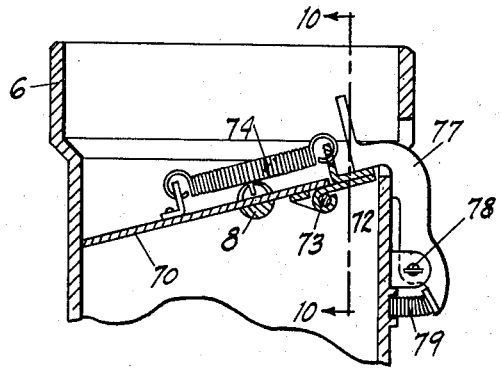
Figure 6 shows a sectional detail view of a slightly modified form of the valve controlling device.

With respect to the device shown in Figures 4 and 5, the chief difference between this and the device shown in Figures 6 to 10 is in the provision of an adjustment. This comprises a screw 80 mounted in bracket 81 which is carried by the choke valve 70. A spring 82 is provided to hold the device in adjusted position, and the end of screw 80 contacts with the modified latch member 83 for adjusting its position.

Figure 8:
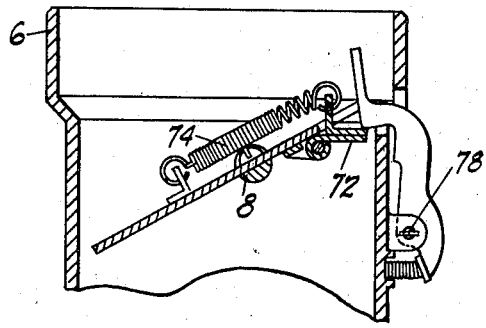
Figure 9:
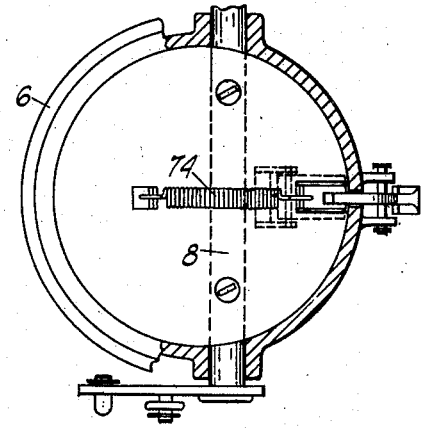
Figure 9 is a plan view of the parts shown in Figures 6 to 8, with parts broken away and others shown in section.
Figure 10:
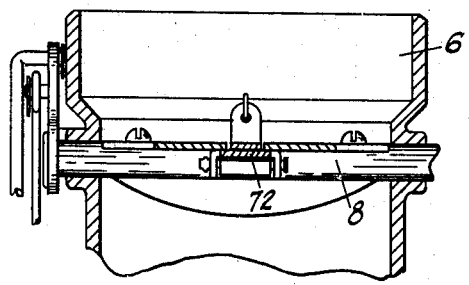
Figure 10 is a sectional view taken along the line 10—10 of Figure 6.

In operation, the spring 74 provides a strong but resilient resistance to the opening of valve 70 by suction, and as the suction is applied, the spring 74 is stretched and the member 72 rotated to the position shown in Figure 8. At approximately this position, the member 72 slides out from under the latch 77, and the choke valve snaps open to a substantial extent. By the use of this means for placing additional resistance against the opening of the valve 70, a much weaker thermostat may be used and, of course, this reduces the cost of the device as well as giving a more satisfactory device for general operation.

Figure 7:
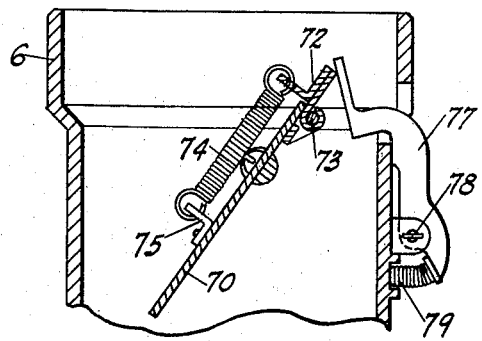
Figures 7 and 8 show the same parts as Figure 6, but in a different operating position.

When the engine is stopped and begins to cool off, the thermostat gradually closes the choke valve; and, in closing, the member 72 strikes the member 77, as indicated in Figure 7, and compresses spring 79 which, being very light and easily displaceable, offers substantially no resistance to the closing of the choke valve. The operation is the same otherwise as in the device shown in Figures 1 and 2.

In addition to these elements above enumerated, an accelerating pump comprising a cylinder 84 and a piston 85 is provided. The cylinder is provided with an inlet check valve 86 and an outlet check valve 87 leading to a conduit 88 which discharges into the mixing conduit, as indicated at 89. The piston is operated from the lever 47 carried by the throttle shaft and link 48 which operates rock shaft 49, as previously described. The piston is connected to the rock shaft by means of a connecting rod 90.

Preparatory to starting, it is desirable, though not absolutely necessary to operate the throttle several times, thereby actuating the accelerating pump and discharging a certain amount of priming fuel into the carburetor through the nozzle 89.

Due to the fact that the suction increases very substantially when the motor begins to run under its own power, the raw fuel remaining in the manifold after the cranking operation, begins to vaporize rapidly, and the new fuel coming in is also fairly well vaporized. It is accordingly desirable to have the first opening movement of the choke valve occur at a fairly rapid rate to prevent loading of the engine. After the choke valve has been opened about half way, however, the further opening movement should occur at a slower rate, so that the choke valve will not reach its full open position until the engine has been thoroughly warmed up.

Figure 3:
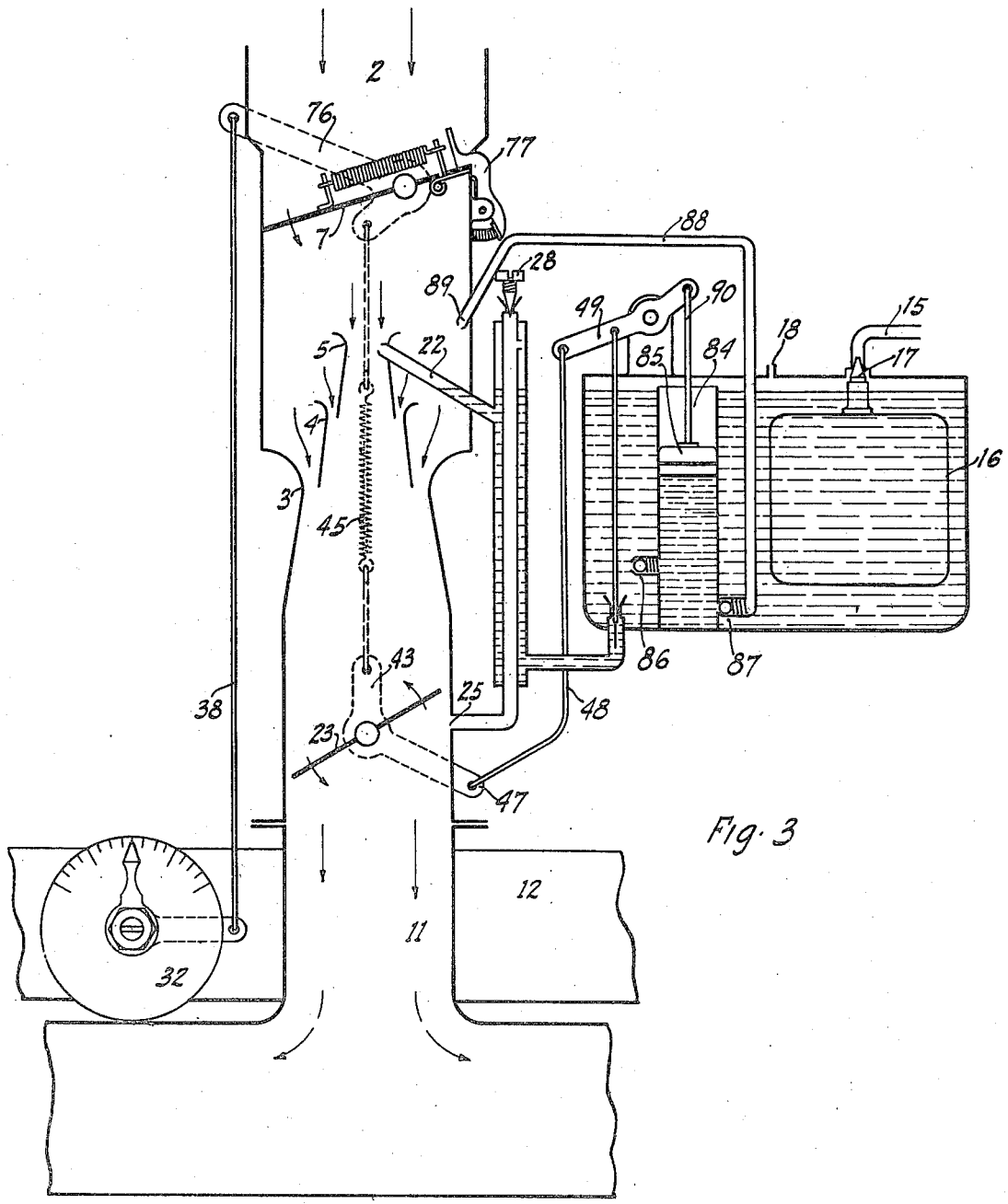
Figure 3 is a diagram indicating the general construction and operation of a slightly modified carburetor according to our invention.

This operation is obtained by the construction shown in Figures 1 and 3 in which it will be noted that the operating arm 37 extends upwardly at an angle of about 45 degrees from the shaft 8 when the choke valve is in closed position. The corresponding position of the yoke 35 is horizontal. During the first stages of the opening movement of the choke valve, the angular velocity of the arm 37 is greater than the angular velocity of the yoke 35, but as the opening movement proceeds, the relative angular velocity of arm 37 with respect to yoke 35 decreases. In this manner, the choke is opened rapidly at the start, but is not fully opened until after the engine is thoroughly warmed up.

The invention is not limited to the structure shown but may be modified in various respects as will occur to those skilled in the art and the exclusive use of all such modifications as come within the scope of the appended claims is contemplated.

We claim:

1. In a carburetor, a suction operable choke valve, a heat responsive member for controlling said choke valve, and a detent for yieldably resisting the opening of said choke valve once it has been moved to substantially closed position.

2. In a carburetor, a suction operable choke valve, a heat responsive member for controlling said choke valve, and a detent for yieldably resisting the opening of said choke valve once it has been moved to substantially closed position, said detent acting to return said choke valve to closed position until said valve has been opened a predetermined amount.

3. In a carburetor, a suction operable choke valve, a heat responsive member for controlling said choke valve, a detent for yieldably resisting the opening of said choke valve once it has been moved to substantially closed position, said detent acting to return said choke valve to closed position until said valve has been opened a predetermined amount, and said choke valve being controlled by said heat responsive devices and by suction without interference by said detent after the valve has been opened a predetermined amount.

4. In a carburetor, a throttle valve, a choke valve, a spring connection between said throttle and said choke valve, said spring connection tending to open said choke valve when said throttle valve is moved to fully closed position.

5. In a carburetor, a throttle valve, a choke valve, a spring connection between said throttle and said choke valve, said spring connection tending to open said choke valve when said throttle valve is moved to fully opened position, said choke valve being constructed and arranged to open in response to suction, and yieldable means for resisting the opening of said valve by suction when the temperature is low.

6. In a carburetor, a throttle valve, a choke valve, a spring connection between said valves, said connection tending to open said choke valve upon a movement of said throttle to either substantially open or substantially closed position.

7. In a carburetor, a throttle valve, a suction operable choke valve, a heat responsive member for controlling said choke valve, means operative when said choke valve has been nearly closed to complete the closing movement thereof, and a spring connection for applying a force to said choke valve upon a movement of said throttle valve.

8. In a carburetor, a throttle valve, a choke valve, a heat responsive member for operating said choke valve, and means for yieldably resisting the effect on said choke valve of said heat responsive member in accordance with a closing movement of said throttle valve.

9. In a carburetor, a throttle valve, a choke valve, a heat responsive member for operating said choke valve, and means for yieldably resisting the effect on said choke valve to said heat responsive member in accordance with both opening and closing movements of said throttle valve.

10. In a downdraft carburetor, a throttle valve, a choke valve, a shaft for said choke valve eccentrically attached thereto, whereby said choke valve may be operated by suction, an upper operating arm for said choke shaft so mounted with respect thereto as to extend upwardly and outwardly when the choke valve is in closed position, a thermostatic coil having inner and outer ends, a shaft concentric with said coil, a lower operating arm mounted to rotate about the center of said shaft, said arm being operatively connected with one end of said coil, linkage connecting said operating arms, said lower operating arm being in a substantially horizontal position when the choke valve is closed, whereby the first opening movement of said choke valve will be performed at a greater rate than the corresponding angular movement of said lower operating arm, and whereby the subsequent angular movement of said choke valve will be performed at a lower rate than the corresponding angular movement of said lower operating arm.

11. In a carburetor, a choke valve, an eccentrically mounted shaft therefor, a first operating arm for operating said choke shaft, a second rotatably mounted operating arm, a link connecting said arms, the length of said link being substantially greater than the center distance between the choke valve shaft and the center of rotation of the second operating arm, a heat responsive member for operating said second arm, and latch means for holding said choke valve in closed position.

12. In a carburetor, a choke valve, an eccentrically mounted shaft therefor, a first operating arm for operating said choke shaft, a second rotatably mounted operating arm, a link connecting said arms, the length of said link being substantially greater than the center distance between the choke valve shaft and the center of rotation of the second operating arm, a heat responsive member for operating said second arm, latch means for holding said choke valve in closed position and means for releasing said latch upon the application of a predetermined suction.

13. In a carburetor, a choke valve, an eccentrically mounted shaft therefor, a first operating arm for operating said choke shaft, a second rotatably mounted operating arm, a link connecting said arms, the length of said link being substantially greater than the center distance between the choke valve shaft and the center of rotation of the second operating arm, a heat responsive member for operating said second arm, a throttle valve posterior to said choke valve, and a connection between said throttle valve and choke valve, said connections tending to cause an opening movement of said choke valve upon a closing movement of said throttle.

14. In a carburetor, a choke valve, an eccentrically mounted shaft therefor, a first operating arm for operating said choke shaft, a second rotatably mounted operating arm, a link connecting said arms, the length of said link being substantially greater than the center distance between the choke valve shaft and the center of rotation of the second operating arm, a heat responsive member for operating said second arm, and a connection between said throttle valve and said choke valve, said connection tending to cause an opening movement of said choke valve in response to an opening movement of said throttle.

15. In a carburetor, a throttle valve, a choke valve, operating arms connected to each of said valves, the operating arm on said throttle valve being so mounted as to most nearly approach the operating arm of the choke valve when the throttle valve is in a partially open position, and a spring connection between said operating arms.

16. In a carburetor, a throttle valve, a choke valve, operating arms connected to each of said valves, the operating arm on said throttle valve being so mounted as to most nearly approach the operating arm of the choke valve when the throttle valve is in a partially open position, a spring connection between said operating arms, and a heat responsive device for operating said choke valve.

17. A control mechanism for an internal combustion engine carburetor having a throttle and an air pressure actuated choke valve, comprising a temperature responsive element arranged to have tension when cold and zero tension at the normal operating temperature of the engine, link means connecting the element to the valve to cause said tension to bias the valve closed, and means actuated by the throttle moving into its limit positions for partially opening said valve against said tension.

18. In a carburetor, a pressure responsive choke valve, a temperature responsive member for influencing the movement of said choke valve, and a retaining device operable when the choke valve is in substantially closed position to yieldably resist opening movement of the choke valve and to yieldingly urge the same to fully closed position, said choke valve being controlled by said temperature responsive device and by suction without interference by said retaining device after the choke valve has opened beyond a predetermined point.

19. In a carburetor, choke and throttle valves, means for yieldingly closing said choke valve when the temperature is low, an operative connection between said choke and throttle valves for producing an opening movement of said choke valve against said closing means when said throttle valve is substantially opened, and a yielding device independent of said choke closing means for resisting said opening of the choke valve by the throttle valve.

20. In a carburetor, choke and throttle valves, a thermostat for yieldingly closing said choke valve when the temperature is low, an operative connection between said choke and throttle valves to apply a force to said choke valve for opening the same against said thermostat responsive to an opening movement of said throttle valve beyond a predetermined position, and a device rendered operative by movement of said choke valve to its closed position for resisting opening of said choke valve by said connection independently of the resistance of said thermostat.

21. In a carburetor, choke and throttle valves, a thermostat for yieldingly closing said choke valve when the temperature is low, an operative connection between said valves for opening said choke valve from its closed position during the part of the opening movement of said throttle valve beyond a predetermined partially starting-position, and a device independent of said thermostat and rendered operative only when said choke valve is moved to its closed position for applying yielding resistance to said part of the throttle opening movement.

22. In a carburetor, choke and throttle valves, a manual control for said throttle valve, a thermostat for yieldingly closing said choke valve when the temperature is low, an operative connection between said valves for opening said choke valve against said thermostat when said throttle valve is substantially opened, a spring mounted independently of said thermostat, and mechanism rendered operative by movement of said choke valve to its closed position and of said throttle valve to a substantially open position for providing an operative connection between said spring and said throttle so as to cause stressing of said spring by continued throttle opening movement.

23. In a carburetor, choke and throttle valves, a manual control for said throttle valve, a thermostat for yieldingly closing said choke valve for cold starting, an unloader connection between said valves for opening said choke valve against said thermostat during throttle opening movement beyond a partially open starting position, a spring device, and means actuable responsive to closing of said choke for forming a connection between said spring device and said throttle valve whereby said spring device is distorted when said throttle is opened beyond said starting position and at least before substantial opening of said choke valve by said throttle, the opening of said choke valve by said throttle occurring subsequent to the point in the throttle opening movement immediately prior to stressing of said spring by said throttle.

24. In a carburetor, choke and throttle valves, a manual control for moving said throttle valve to a partially open starting position, a thermostat for yieldingly closing said choke valve when the temperature is low, an operative connection between said valves for opening said choke valve during opening of said throttle valve beyond said starting position, a spring mounted independently of said thermostat, and an element movable, by closing of said choke valve, to a position to cause said spring to resist opening of said throttle valve beyond said starting position.

25. In an internal combustion engine, means forming a mixing conduit, a throttle valve for said mixing conduit, means for controlling the richness of the mixture delivered by said carburetor, heat responsive means for setting said mixture controlling means in a mixture enriching position for starting purposes when the temperature is low, said throttle valve having open and closed positions and a starting position therebetween, means operable by an opening of the throttle beyond its starting position for displacing said mixture control device from said mixture enriching position, and yieldable means resisting the initial displacement of said mixture enriching device.

26. In an internal combustion engine, means forming a mixing conduit, a throttle valve for said mixing conduit, means for controlling the richness of the mixture delivered by said carburetor, heat responsive means for setting said mixture controlling means in a mixture enriching position for starting purposes when the temperature is low, control means for moving said throttle valve to opened and closed positions and a starting position therebetween, means operable by an opening of said throttle valve beyond its starting position for displacing said mixture control device from said mixture enriching position, and yieldable means resisting the initial displacement of said mixture enriching device, said throttle control means being yieldable, whereby a substantial opening movement of said throttle valve beyond the starting position is permitted before said mixture controlling device is displaced from its starting position.

27. In a carburetor, choke and throttle valves, a thermostat for yieldingly closing said choke valve for cold starting, means for effecting joint opening movement of said valves comprising a manual throttle control and an operative connection between said valves whereby said choke valve is opened when said throttle valve is opened beyond its partially open starting position, and mechanism capable of resisting opening of said throttle comprising a spring device and means actuable responsive to closing of said choke valve and opening of said throttle beyond said starting position to form a connection between said spring device and said throttle constructed and arranged to cause stressing of said spring device upon continued throttle opening movement, the opening of said choke valve by said throttle occurring subsequent to the point in the throttle opening movement immediately prior to stressing of said spring device by said throttle.

GEORGE R. ERICSON.
CHARLES E. MARKHAM.